United States Patent Office 2,987,488
Patented June 6, 1961

2,987,488
GRAPHITE BORON NEUTRON SHIELDING
Eugene V. Clark, Jr., Long Beach, Calif., assignor to North American Aviation, Inc.
No Drawing. Filed Nov. 25, 1955, Ser. No. 549,150
7 Claims. (Cl. 252—478)

This invention relates to a new and novel neutron shielding material and a process of making such material.

Heretofore, graphite, as well as other materials, has been used as thermal neutron shielding material. Graphite alone, however, does not have an optimum shielding effect for both fast and slow neutrons. The present invention provides a specific boron-impregnated graphite which is formed into shielding blocks for use in a nuclear reactor as a neutron shielding material. More particularly, the invention concerns a new composition of matter, used as a shielding material, comprising boron oxide and graphite.

An object of this invention is to provide a composition of matter comprising boron oxide and graphite.

A further object of this invention is to provide a composition of matter consisting of graphite and from 10% to 60% by weight of boron oxide impregnated therein.

A still further object of this invention is to provide boron-impregnated graphite neutron shielding material.

An additional object of this invention is to provide a method for making boron-impregnated graphite.

The above objects as well as other objects of this invention will be apparent from the following description of the invention.

The first approach to the problem of impregnating graphite with boron was an attempt at using the freeze-dry technique. The graphite was impregnated with a hot, saturated solution of a boron salt, cooled to room-temperature to precipitate the salt at place and dried in a vacuum. Various borax minerals $$(Na_2B_4O_7 \cdot 5H_2O \text{ and } Na_2B_4O_7 \cdot 10H_2O)$$

having melting points in the desired range were used as the boron salt. A graphite with a large average pore diameter and low density was used with the boron salt. Test results using AGX type graphite with an apparent density of 1.55 resulted in a boron content of 10 mg. per cc. The goal in the present development was to obtain a graphite block containing at least 100 mg./cc. It was then discovered that when a fusible salt of boron; namely, boron oxide was mixed with graphite in a certain percentile range and then hot-pressed to a solid mass under certain conditions that over 100 mgs. per cc. of boron would be present in the resultant graphite block. The boron oxide may be used in the hydrated form and should preferably be powdered to a size in accordance with conventional powder metallurgy techniques. The graphite must also be pulverized (−200 mesh is typical) and of sufficient uniformity to impart strength and stability to the shielding block. The graphite used is normally reactor-grade graphite, the properties of which may be seen in The Reactor Handbook, volume III, entitled "Materials," published March 1955 by the U.S. Government Printing Office.

In practicing the present invention, the boron oxide powder and graphite are mixed so that the product will have from 10% to 60% by weight boron oxide. While some amounts of impurities may be present, the invention contemplates having the remainder of the composition (40% to 90% by weight) graphite. Preferably, the mixing of the powdered boron oxide and powdered graphite is done in a ball mill or other mechanical mixing device. The next step in forming the neutron shielding blocks is hot-pressing the boron oxide-graphite mixture. Pressures from 1,000 p.s.i. to 7,000 p.s.i. are applied to steel dies into which the above mixture is placed. Pressures of 1,000 p.s.i. to 3,500 p.s.i. can be used when employing graphite dies. The pressing takes place at a temperature of from 200° C. to 1,200° C. for a sufficient time to coalesce the mixture. While some of the temperatures used are considerably below the melting point of boron oxide (577° C.) it has been found that plastic flow at these pressures and temperatures binds the graphite and boron oxide particles into a hard, structurally strong block. Conversely, some difficulty is encountered at higher temperatures in having the $B_2O_3$ spew out of the dies. The actual time necessary to accomplish the invention is dependent on the particular pressure and temperature used and the size of the powdered particles. Typical times are seen in the examples given below.

A powder mixture was prepared by mixing 19.2% by weight $B_2O_3$ (containing 3% volatiles) and 80.8% by weight of APX graphite, both in powdered form. This mixture was then hot-pressed in steel dies at 6,000 p.s.i. and 300° C. for 1½ hours. The original graphite had a density of 1.55 g./cc. and the hard block resulting had a density of 1.8–1.9 g./cc. and a boron content of 118 mg./cc. The above mixture in another test run pressed at 4,500 p.s.i. and 300° C. resulted in a block having a 1.76 g./cc. density and a boron content of 106 mg./cc. A further run at 310° for 1½ hours while steadily increasing the pressure from 3,000 p.s.i. to 6,000 p.s.i. for 1¼ hours and then dropping the pressure over the last ¼ hour was also obtained. This run resulted in a block having some excess elongation when reheated into temperature ranges at which the shield operates (e.g. 700° C.).

A further mixture using about 20% by weight anhydrous boron oxide (prepared by fusing $B_2O_3 \cdot XH_2O$ in high vacuum at 600° C. and then pulverizing to a powder) in graphite (dried at 120° C. for one hour) was prepared which was then hot-pressed at 6,000 p.s.i. and 310° C. to form a finished hard block.

A still further mixture of 18.9 wt. percent $B_2O_3$ powder and a remainder of −200 mesh AGX graphite powder was milled and placed in a graphite die. The mixed powders were subjected to a pressure of 2,900 p.s.i. and a temperature of 1000° C. for seven minutes. The resultant body had a density of 1.6 g./cc., a boron concentration of 94 mg./cc., was easily machined, and had good dimensional stability at operating temperatures.

Although the invention has been described in detail by the above examples and description, it is to be clearly understood that the same is by way of description and example only and is not to be taken by way of limitation, the spirit and scope of this invention being limited only by the terms of the appended claims.

I claim:
1. A composition of matter consisting essentially of from about 10% to 60% by weight boron oxide and the remainder from about 40% to 90% by weight graphite.

2. A neutron shielding material consisting of a mechanically coalesced mixture of pulverized graphite and from 10% to 60% by weight of boron oxide.

3. The method of making boron oxide-impregnated graphite having a high boron content comprising mixing pulverized graphite and pulverized boron oxide, said mixture consisting essentially of 10% to 60% boron oxide by weight and the remainder from 40% to 90% graphite by weight, and pressing said mixture at a pressure of from 1,000 p.s.i. to 7,000 p.s.i. at a temperature of from 200° C. to 1,200° C. for a sufficient time to coalesce said mixture.

4. The method of claim 3, wherein said mixture consisting essentially of approximately 20% boron oxide, by weight, and the remainder graphite.

5. A composition of matter consisting essentially of a hot pressed mixture of approximately 20% boron oxide, based on the weight of said composition, and the remainder graphite, said composition having a boron content of from about 94 milligrams to about 118 mg. per cc.

6. A neutron shielding material consisting essentially of a mechanically coalesced mixture of pulverized graphite and boron oxide, said material having a boron content of from about 94 milligrams to about 118 milligrams per cc.

7. The method of making boron oxide-impregnated graphite, comprising forming a mixture consisting essentially of about 20 weight percent pulverized boron oxide and the remainder pulverized graphite, and pressing said mixture at a pressure of about 3,000 p.s.i. and at a temperature of about 300° C. until said mixture has coalesced.

References Cited in the file of this patent

UNITED STATES PATENTS

| | | |
|---|---|---|
| 1,897,214 | Ridgway | Feb. 14, 1933 |
| 2,063,329 | Morrison | Dec. 8, 1936 |
| 2,097,482 | Weber et al. | Nov. 2, 1937 |
| 2,106,578 | Schwartzwalder et al. | Jan. 25, 1938 |
| 2,369,212 | Cooper | Feb. 13, 1945 |
| 2,769,918 | Tittle | Nov. 6, 1956 |

FOREIGN PATENTS

| | | |
|---|---|---|
| 456,602 | Great Britain | Nov. 12, 1936 |

OTHER REFERENCES

Principles of Nuclear Reactor Engineering by Samuel Glasstone, D. Van Nostrand Co., New York, 1st edition, July 1955, pages 586–589. September 1954 Nucleonics, pages 50–54.

Reactor Handbook, vol. 3, (TID-3647), U.S. Atomic Energy Commission publication, February 1955; pages 522–523.

International Conference on the Peaceful Uses of Atomic Energy, Aug. 8–20, 1955, vol. 3, pages 138, 194, publ. by United Nations, N.Y.